United States Patent [19]

Mathew et al.

[11] E Re. 29,197

[45] Reissued May 3, 1977

[54] SHOVEL LOADERS

[75] Inventors: Leonard Stanley Mathew, Abinger Hammer, England; George William Allister Chapman, Belfast, Northern Ireland

[73] Assignee: Matbro Limited, Horley, England

[22] Filed: Nov. 5, 1975

[21] Appl. No.: 628,876

Related U.S. Patent Documents

Reissue of:

[64] Patent No.: 3,007,590
Issued: Nov. 7, 1961
Appl. No.: 795,625
Filed: Feb. 26, 1959

[52] U.S. Cl. ..... 214/140; 180/51

[51] Int. Cl.[2] ..... E02F 3/62

[58] Field of Search ..... 214/131 R, 140, 773; 180/50, 51, 52, 134–139; 280/111

[56] References Cited

UNITED STATES PATENTS

| | | | |
|---|---|---|---|
| 1,272,757 | 7/1918 | Yoder | 180/49 |
| 1,623,214 | 4/1927 | Storey | 180/50 |
| 1,957,917 | 5/1934 | Storey | 180/50 |
| 2,219,533 | 10/1940 | Ross | 180/14 R |
| 2,426,652 | 9/1947 | Storey | 180/50 |
| 2,726,778 | 12/1955 | Hough et al. | 214/140 |
| 2,828,878 | 4/1958 | Le Tourneau | 214/510 |
| 2,835,397 | 5/1958 | Wagner | 180/51 X |
| 2,837,349 | 6/1958 | Hawk | 280/492 |
| 2,884,083 | 4/1959 | McColl | 180/136 X |
| 2,914,202 | 11/1959 | Wagner | 214/140 X |

FOREIGN PATENTS OR APPLICATIONS

| | | |
|---|---|---|
| 542,366 | 6/1957 | Canada |
| 326,654 | 10/1932 | Canada |
| 488,662 | 12/1952 | Canada |
| 650,308 | 9/1928 | France |
| 14,635 | 6/1900 | United Kingdom |

OTHER PUBLICATIONS

*The Commercial Motor*, Dec. 12, 1952, p. 604.
South African Patent Application No. 2455/56 pub. July 30, 1956.

*Primary Examiner*—L. J. Paperner
*Attorney, Agent, or Firm*—George Vande Sande

[57] ABSTRACT

*A shovel loader in which the engine is supported over a rear axle which can pivot about a longitudinal axis in relation to the engine. The engine and the other axle are pivotable in relation to each other about a vertical pivot axis. This arrangement increases the lateral stability of the loader, particularly when cornering.*

6 Claims, 4 Drawing Figures

INVENTORS:
Leonard S. MATHEW
George W. A. CHAPMAN
By
Wenderoth, Lind & Ponack
ATTORNEYS INVENTORS:
Leonard S. MATHEW
George W. A. CHAPMAN
By:
Wenderoth, Lind & Ponack
ATTORNEYS Fig. 3.
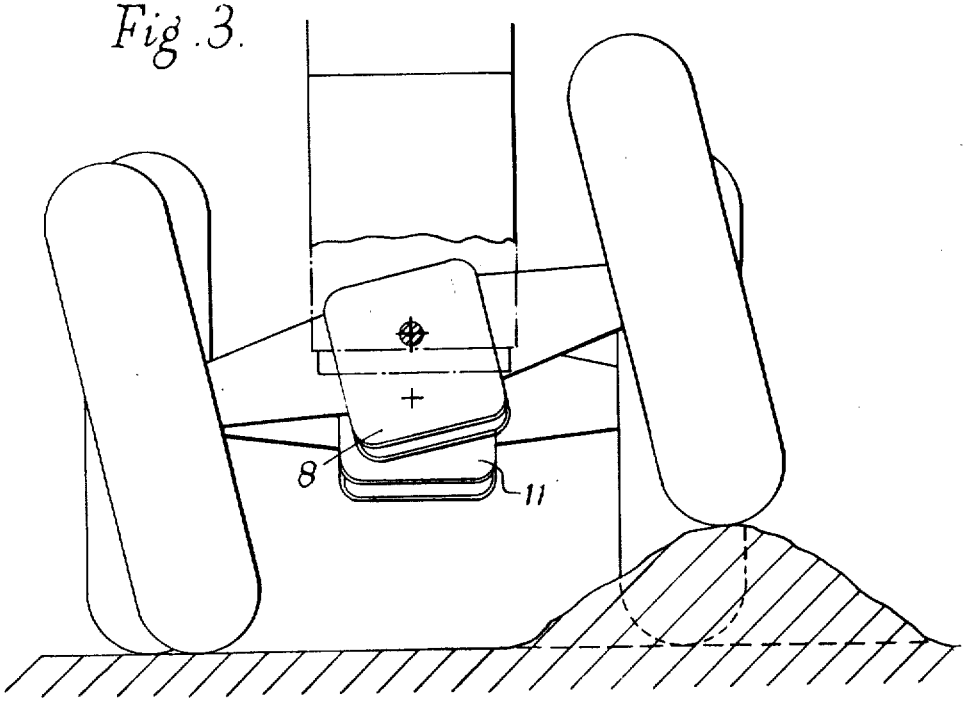
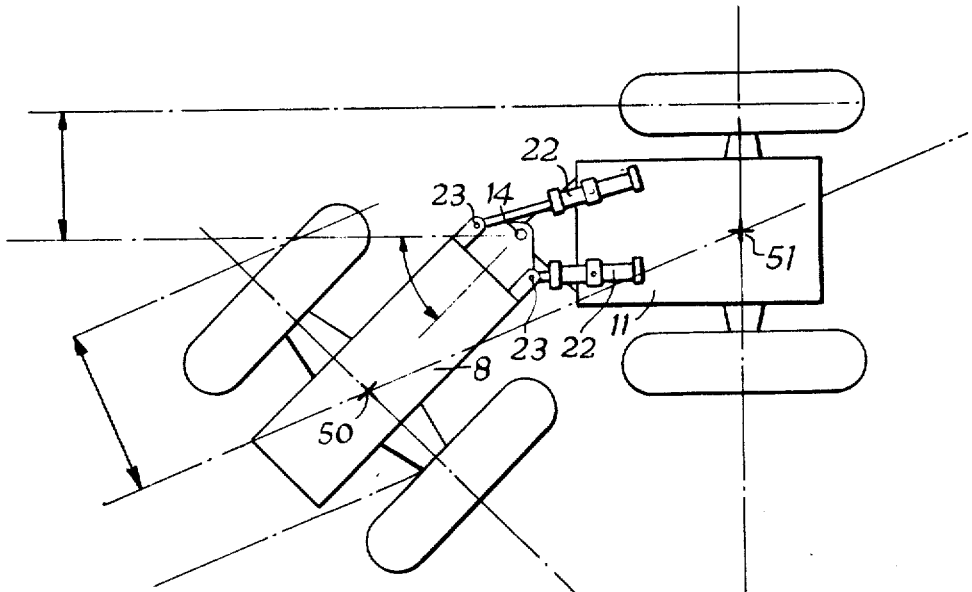
Fig. 4.
INVENTORS:
Leonard S. MATHEW
George W. A. CHAPMAN
By:
Wenderoth, Lind & Ponack
ATTORNEYS

SHOVEL LOADERS

Matter enclosed in heavy brackets [ ] appears in the original patent but forms no part of this reissue specification; matter printed in italics indicates the additions made by reissue.

The present invention relates to tractor mounted shovel loaders.

It is well-known to mount loading shovel equipment onto a wheeled-tractor chassis. It is an object of the present invention to produce a loading shovel of this kind which is capable of operation in difficult conditions over rough terrain, but which is at the same time of inexpensive construction. To achieve this object it is necessary that the tractor should have four-wheel drive. On the other hand, it is desirable to eliminate the use of special steerable driving axles to keep down the cost of the machine. For this purpose, therefore, the loading shovel equipment is mounted on a four-wheel drive tractor of the type in which a steering facility is provided by turning the front and rear axles in relation to each other about a vertical pivot in the vehicle frame located approximately midway between the two axles.

When a wheeled tractor is used to support loading shovel equipment, it is usual to have the engine at the rear and the driver's seat over the front axle to permit the driver to exercise close control over the bucket.

It has been the practice heretofore, however, to mount loading shovel equipment on a four-wheel drive of the present type in which the engine and transmission are rigidly supported by one axle and the other axle can therefore move about two pivot axes in relation to the engine.

Because of control difficulties it has been found necessary with known rear-engined shovel loaders to place the driver's seat over the rear axle, which is definitely disadvantageous from operating considerations.

The present invention proposes to overcome this difficulty in a very simple manner by supporting the engine over a rear axle which can pivot about a longitudinal axis in relation to the engine, the engine and the other axle then being pivotable in relation to each other about the vertical pivot axis. The reduction of the degree of freedom of movement between the engine and the front axle permits controls to be carried through from a driver's seat positioned over the front axle to the rear mounted engine and transmission gear box in quite a simple manner.

A quite different advantage of the novel construction is that it provides increased lateral stability for the loader, particularly when cornering. The lateral stability characteristics of this type of vehicle on cornering are in any case good, because the center of gravity moves towards a line joining the two inner wheels as soon as the axles are turned about their vertical pivot. However, when the known type of loader is operated over uneven ground, any tilting of the forward axle moves the center of gravity of the bucket and its load over or even outwardly of one wheel, so that the load on the wheel is excessive. The bucket may acquire a momentum laterally of the vehicle, as the front axle twists about the longitudinal pivot axis, which acts to overturn the vehicle when the stop, which limits further twisting, is reached.

In contradistinction, in the construction of the present invention any tilting of the front axle is accompanied by like tilting of the engine and transmission unit, which thus acts at all times as a counterweight.

Another advantage of the present construction over the prior arrangement is that it permits the overhang of the engine beyond the rear axle to be much reduced as compared with the known arrangements. This, coupled with the resulting possibility of reduction of overall length, permits a loader to be constructed which can be more easily handled in confined spaces. This increase in manoeuvrability and the forward positioning of the driver's seat also makes the four-wheeled drive chassis utilised a most convenient chassis for fork lift equipment, where a heavy duty fork lift truck is required for operation in difficult conditions.

A still further advantage of the present construction as compared with the known arrangement is that it permits the vertical pivots connecting the front and rear axles to be more widely spaced than has hitherto been practicable, thus considerably reducing undesirable "play" between the front and rear of the loader in the vertical pivot pins.

In a practical construction of loader made in accordance with the present invention the front and rear axle assemblies are, in fact, identical and consist of a standard rear axle and final drive assembly of a type used in agricultural tractors. The vertical pivot axis is provided in an intermediate section lying between the two axles, and the rear axle, over which the engine is supported, is provided with bearings at both ends to permit it to tilt laterally in relation to the rest of the machine.

A construction of loader made in accordance with the invention is shown in the accompanying drawings, wherein:

FIG. 3 is a diagrammatic view showing the relative tilting of the axles on rough terrain.

FIG. 4 is a diagram showing the turning motion of the tractor.

Figure 1:
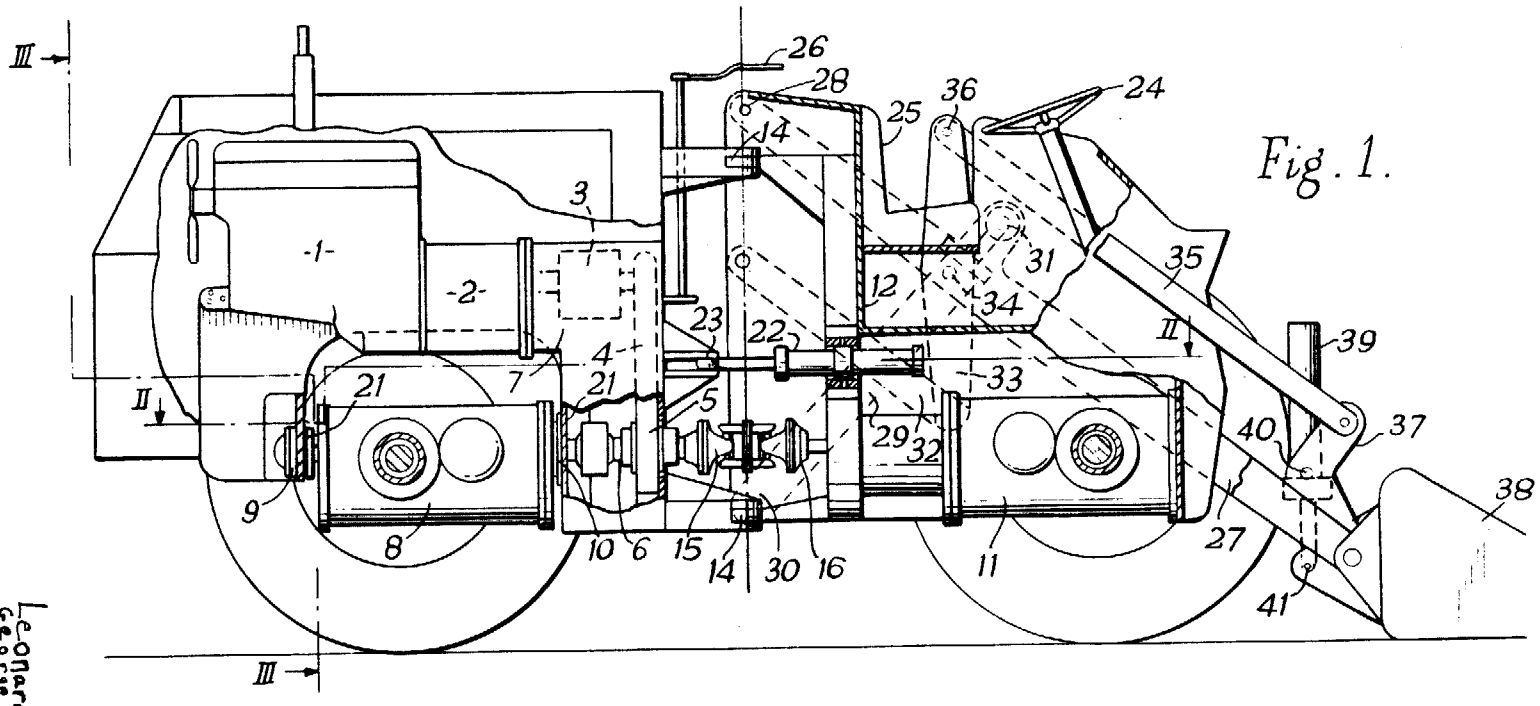
FIG. 1 is a side view of a loader partially in section.

Referring to the drawings, FIG. 1 shows a loader having an engine 1, a torque converter 2, an auxiliary gear box 3 and a vertical gear train 4 driving to a pinion 5 on a shaft 6. The engine, torque converter and gear box are all rigidly mounted in relation to the housing 7 in which the gear train 4 is mounted and this assembly is pivotally connected to the rear axle 8 by means of a double taper roller bearing assembly 9 at the rear end of the axle and a large roller bearing assembly 10 at the front of the axle. The rear axle 8 of the vehicle is therefore pivotally mounted in relation to the engine and transmission supported immediately above it.

The front axle 11 is rigidly connected to a front framework 12, which is in turn connected to the rear part on a vertical pivot axis at the center of the machine, i.e. the mid-point between the front and rear axles. The connection between the front and rear part consists of tongue and fork joints 14, provided with pivot pins of suitable diameter dependent on the size of the tractor, supporting the loading shovel equipment. The joints 14 are widely spaced in the vertical direction so as to give stiffness to the machine. The drive from the shaft 6 to the front axle 11 is taken through a double universal joint 15 and 16 and this permits the front axle to be turned to an angle of 45° in relation to the rear axle 8.

The drive to the rear axle 8 from the shaft 6 is taken through a flexible coupling 17 (to allow for any misalignment) to a shaft 18 which forms part of the standard agricultural tractor axle 8. The forward connection of the axle 8 to the vehicle is provided by means of a spigot sleeve 19 secured to the casing of the axle 8 and supporting the roller bearing assembly 10. The bearing assembly 10 is located within a collar 20, which is in turn secured to a frame member 21, which is an integral part of the frame which supports the engine 1 and transmission and is connected to the rear end of the axle 8 at the support bearings 9.

The steering of the machine is effected by two double acting, hydraulic jacks 22 mounted in trunnions in the forward frame 12 of the machine and pivotally connected at 23 to the rear frame of the machine. The flow of hydraulic fluid to the jacks 22 is controlled in a known manner by means of the steering wheel 24 which operates a valve to permit flow of hydraulic fluid to the jacks until the axles 8 and 11 have reached a relative angularity corresponding to the position of the steering wheel. At such moment a follow-up mechanism stops further hydraulic fluid flow. This is in accordance with known principles of hydraulic steering and does not form part of the present invention.

The supply of hydraulic fluid to the jacks is preferably controlled by a valve in which, in its neutral position, the ports leading to both sides of the jack pistons are closed, so that the jacks are hydraulically locked. This means that tractive and compressive forces can be taken up in the piston rods, thus relieving the pivot pins of the joints 14 from excessive wear.

Since the frame 12 which supports the steering wheel 24 and the driver's seat 25 pivots with regard to the engine and the transmission only about the vertical axis passing through the joints 14, there is no difficulty in providing for the engine controls to be led from the engine to the driver's seat. The torque converter control is effected by means of a Bowden cable and is likewise easily carried through from the rear to the front part of the tractor. The auxiliary gear box 3 is only changed at very infrequent intervals, for example, once or twice a day, when it is desired to change from a travelling range of speeds to a working range of speeds. For this purpose a gear lever 26 is provided and can be reached from the driver's seat 25 although, in fact, all the gear change mechanism for this gear box is in the rear part of the tractor.

The loading shovel equipment is all supported on the front frame 12 (FIG. 1). This equipment consists of a pair of lift arms 27, pivotally connected to the frame 12 at 28, a pair of main lifting jacks 29, pivotally connected to the frame 12 at 30 and to the lift arms 27 at 31, and compensating linkage, comprising pivoted links 32 pivotally connected to the frame 12 and to levers 33.

The levers 33 are pivotally connected to the lift arms 27 at 34 and to bucket links 35 at 36. The bucket links 35 are again pivotally connected to jack-supporting links 37 which are pivoted to the bucket 38. The links 37 carry jacks 39 which are pivoted to the links 37 at 40 and to the bucket 38 at 41. It will be observed that the compensating linkage forms a pair of parallel link systems with the lift arms 27 so that the bucket will remain at a substantially constant angle to the ground, depending on the extension of the jacks 39 but irrespective of the position of the lift arms 27.

Figure 2:
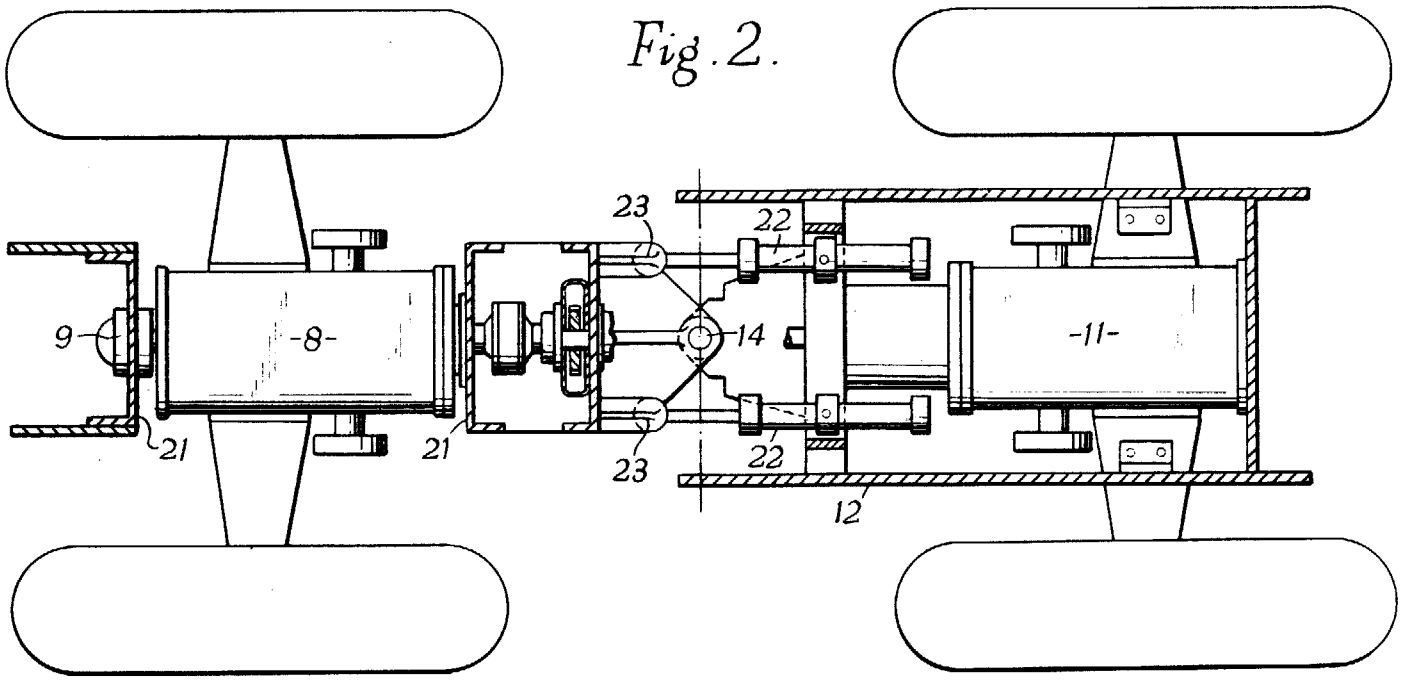
FIG. 2 is a diagrammatic horizontal section showing the arrangement of the axles.

The loading shovel equipment itself is of fairly conventional design and can take other forms. Referring to FIGS. 2 and 4, the method of steering of the vehicle will be readily apparent. In the position shown in FIG. 2 the axles are shown in line with the jacks 22 equally extended. Where, however, one jack is extended and the other contracted, the front and rear axles are caused to turn through an angle relative to each other. Since the pivot 14 is at the mid-point between the axes of the front and rear axles, the wheels of the rear axle will follow in the track of the wheels of the rear axle and this is an important advantage of the present type of vehicle as compared with a normal type of tractor having steerable wheels. As a practical operating advantage, it means that there is relatively little scrubbing of the tyres of the rear axle when operating in rough ground.

The centers of gravity of the portions of the vehicle supported by the front and rear axle assemblies are indicated at 50 and 51 in FIG. 4. It follows, therefore, that the center of gravity of the whole vehicle will lie on the line joining these two points and therefore as the vehicle turns a corner, the center of gravity moves away from the outer wheels, thus giving the vehicle greater stability. Again in FIG. 3 it will be seen that as one of the wheels of the rear axle rides over a bump, there is no tilt to the engine and this to a certain extent improves the riding for the operator over rough ground.

We claim:

1. In a four wheel drive shovel loader in combination a forward frame, a forward driving axle rigidly connected to said forward frame, a rear frame pivotally connected to said forward frame about a vertical axis, a rear driving axle supporting said rear frame and pivotally connected to said rear frame about a horizontal longitudinal axis, said vertical pivot axis being substantially midway between the forward and rear axles, an engine supported on the rear frame, transmission means connecting said engine for drive with said forward and rear driving axles, steering means controlling the relative angle between the forward and rear axles about the vertical pivot axis, a pair of laterally spaced bucket support members pivotally connected to said forward frame, means for raising and lowering said spaced bucket support members, bucket means supported by said bucket support members and an operator's station positioned on said forward frame between said bucket support members and having means for controlling said steering means and means connected to said engine and transmission for controlling said engine and transmission.

2. In a four wheel drive shovel loader in combination a forward frame, a forward driving axle rigidly connected to said forward frame, a rear frame pivotally connected to said forward frame about a vertical axis, a rear driving axle supporting said rear frame and pivotally connected to said rear frame about a horizontal longitudinal axis, said vertical pivot axis being substantially midway between the forward and rear axles, an engine supported on the rear frame, a drive shaft for said rear axle, transmission means connecting said engine for drive with said rear axle drive shaft, a forward axle drive shaft, universal joint means connecting said forward axle drive shaft to said rear axle drive shaft, steering means controlling the relative angle between the forward and rear axles about the vertical pivot axis, a pair of laterally spaced bucket support members pivotally connected to said forward frame, means for raising and lowering said spaced bucket support members, bucket means supported by said bucket support members, and an operator's station positioned on said forward frame between said bucket support members and having means for controlling said steering means and means connected to said engine and transmission for controlling said engine and transmission.

3. In a four wheel drive shovel loader in combination a forward frame, a forward driving axle rigidly connected to said forward frame, a rear frame pivotally connected to said forward frame about a vertical axis, a rear driving axle supporting said rear frame and pivotally connected to said rear frame about a horizontal longitudinal axis, said vertical pivot axis being substantially midway between the forward and rear axles, an engine supported on the rear frame, transmission means connecting said engine for drive with said forward and rear driving axles, steering jacks connecting said forward and rear frames, said jacks being pivotally connected to said frames on opposite sides of said vertical pivot axis or controlling the relative angle between the forward and rear axles, said jacks being lockable in a neutral position to permit longitudinal forces to be transmitted therethrough, a pair of laterally spaced bucket support members pivotally connected to said forward frame, means for raising and lowering said spaced bucket support members, and bucket means supported by said bucket support members, and an operator's station positioned on said forward frame between said bucket support members and having means for controlling said steering means and means connected to said engine and transmission for controlling said engine and transmission.

*4. The shovel loader of claim 1 in which said operator's station is located forwardly of the pivotal connection of said bucket support members to said forward frame.*

*5. The shovel loader of claim 2 in which said operator's station is located forwardly of the pivotal connection of said bucket support members to said forward frame.*

*6. The shovel loader of claim 3 in which said operator's station is located forwardly of the pivotal connection of said bucket support member to said forward frame.*

* * * * *